C. HENRY.
Animal-Trap.

No. 211,094.  Patented Jan. 7, 1879.

Attest:
Clarence Poole
R. K. Evans

Inventor:
Cornelius Henry
by A. H. Evans & Co
atty

UNITED STATES PATENT OFFICE.

CORNELIUS HENRY, OF NEW YORK, N. Y.

IMPROVEMENT IN ANIMAL-TRAPS.

Specification forming part of Letters Patent No. 211,094, dated January 7, 1879; application filed November 27, 1878.

*To all whom it may concern:*

Be it known that I, CORNELIUS HENRY, of the city and State of New York, have invented a Combined Mouse-Trap and Box for Paper Collars and like Articles; and I hereby declare the following to be a full, clear, and exact description thereof, reference being had to the accompanying drawings, making part of this specification, in which—

Figure 1:
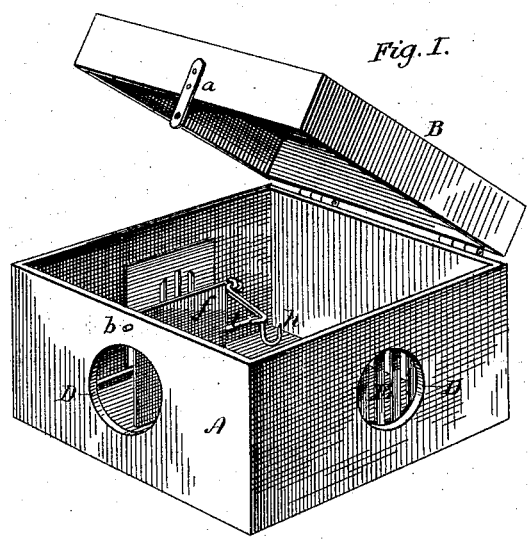
Figure 2:
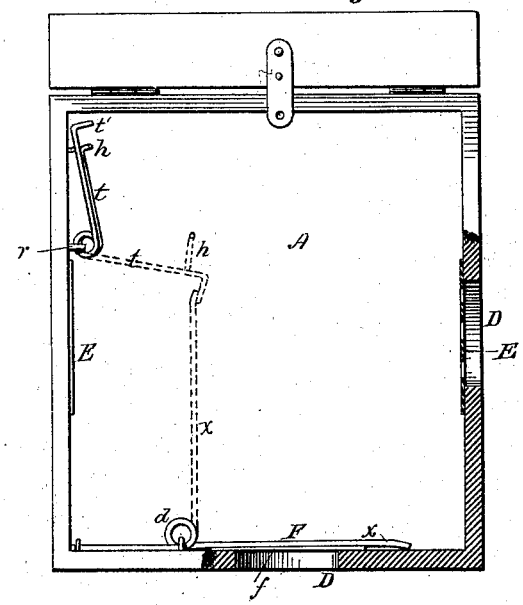

Figure 1 is a perspective view of the combination box with the lid raised and the trapping device set. Fig. 2 is a plan view of the device with the trapping instrumentalities folded against the sides of the box.

The object of my invention is to provide a box wherein is combined a mouse-trap and a receptacle for paper collars or similar goods; and it consists of a cheap box, provided with a hinged lid and catch, and having an opening in one side closed by means of a spring-door, which lies close against the inner surface of the side, and a wire detent and trigger, which folds close against another side of the box, as hereinafter more fully described and claimed.

In order that those skilled in the art may make and use my invention, I will proceed to describe the manner in which I have carried it out.

In the said drawings, A is a cheap veneer box, provided with a hinged lid, B, and a catch, $a\, b$, to secure the lid when down. In the sides of the box I cut circular openings D, which I cover, except in one instance, with gratings E. The opening D in the front of the box is closed by a door, $f$, grated or otherwise, which is attached to a wire, $x$, forming a prolongation of a coiled spring, $d$, lying against the inner surface of the side of the box, and secured at $a$. Near the remote end of the side of the box I secure, by means of a staple, $n$, a twisted-wire trigger, $t$, bent at right angles at $t'$, and having a bait-hook, $h$. The spring, door, and trigger form the trapping devices, and all of them, when the trap is not set, fold close to the sides of the box, so as to leave the interior of the box entirely unoccupied for the reception of paper collars or other articles that it may be desirable to pack in the box.

In traveling it frequently happens that the traveler is annoyed by a mouse cutting in his room and about the furniture. In order to rid himself of the nuisance it is only necessary to remove the collars in the box, bait the hook $h$, pull back wire $x$, which carries door $f$ until its end engages with the rectangular portion $t'$ of the trigger $t$, as seen in Fig. 1, when the trap is set. The mouse enters the opening, nibbles the bait on hook $h$, the door $f$ is disengaged from the detent $t'$, and springs shut, thereby capturing the mouse, subsequently to be transferred to the water in the slop-bucket. The collars can then be returned to the box.

Having thus described my invention, what I claim as new, and desire to secure by Letters Patent, is—

A mouse-trap consisting of the box A B, having the front opening, D, in combination with the internal spring-door $f$ and detent $t$, lying close against the inner surface of the sides, substantially as set forth.

CORNELIUS HENRY.

Attest:
R. K. EVANS,
A. H. EVANS.